L. L. LOVETT.
LAWN MOWER.
APPLICATION FILED APR. 30, 1909.
956,385.
Patented Apr. 26, 1910.
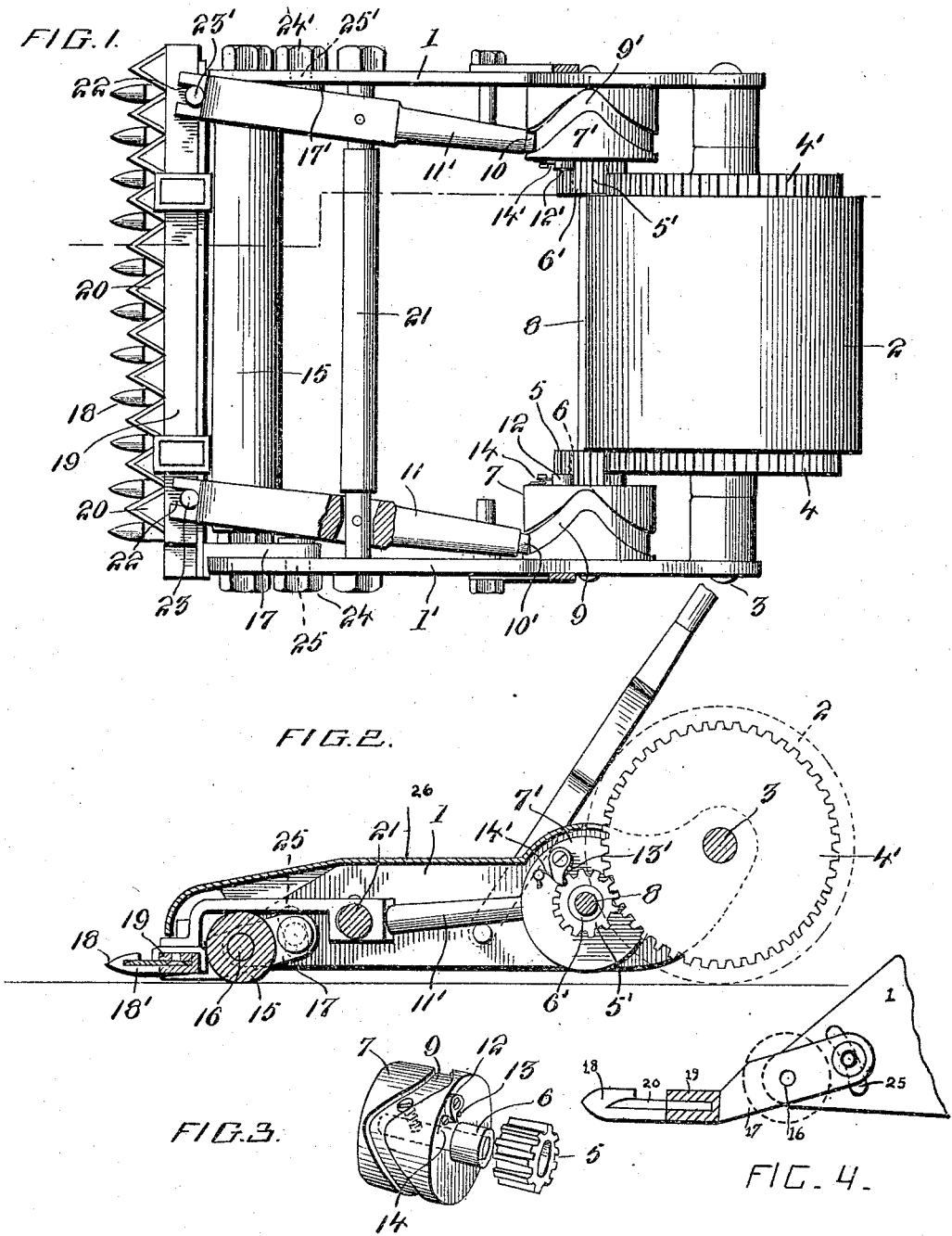

UNITED STATES PATENT OFFICE.

LEWIS L. LOVETT, OF SCHENECTADY, NEW YORK, ASSIGNOR OF ONE-HALF TO GEORGE H. CLOSE, OF SCHENECTADY, NEW YORK.

LAWN-MOWER.

956,385.           Specification of Letters Patent.    Patented Apr. 26, 1910.

Application filed April 30, 1909. Serial No. 493,074.

*To all whom it may concern:*

Be it known that I, LEWIS L. LOVETT, a citizen of the United States, residing at Schenectady, in the county of Schenectady and State of New York, have invented a new and useful Improvement in Lawn-Mowers, of which the following is a specification.

My invention relates to lawn-mowers, and the object thereof is to produce a device of said character in which the cutting blades are driven with greater speed and with less power than heretofore required while running forward, and which is thrown automatically out of gear and action when running backward.

A further object thereof is to provide the necessary adjustments of the knife shoe and cutting bar with relation to the ground, and a still further object of my invention is to provide a more simple, cheap and effective device of said character than has heretofore been attained.

To these ends my invention includes the combinations and arrangements of component parts to be hereinafter described and more particularly pointed out in the claim.

In the accompanying drawings illustrating my invention, in which like reference characters designate similar parts, Figure 1 is a plan view thereof with the top casing removed; Fig. 2 is a longitudinal sectional view of the same, and, Fig. 3 is a detail view of one of the cam wheels and gear keyed therewith. Fig. 4 is a detail view illustrating the means for vertically adjusting the cutter bar.

My invention includes, generally, side frames upon which are mounted a driving wheel and cam wheels geared therewith, a roller adjacent to the forward ends, and a vertically adjustable rigid knife shoe and a reciprocating toothed cutting bar coöperating therewith and driven by pivoted rocking bars from the cam wheels, the said cam wheels being keyed with the driving gears to throw them out of action when reversed.

Referring now to the drawings, 1 and 1' designate the side frames of my lawn mower upon which is loosely mounted the driving wheel 2 adjacent to the rear thereof upon the transverse shaft 3. Said driving wheel is provided on each side with gear wheels 4 and 4' rigidly secured thereon which are adapted to mesh with the gears 5 and 5' loosely mounted on the hubs 6 and 6' on the cam wheels 7 and 7'. Said cam wheels are rigidly mounted on the transverse shaft 8 which has its bearings in the sides 1 and 1', and are provided with parallel cam slots 9 and 9' adapted to receive the free ends 10 and 10' of the rocking bars 11 and 11'. As before mentioned, the cam wheels 7 and 7' are provided with inwardly extending hubs 6 and 6' upon which are loosely mounted the gears 5 and 5'. For the purpose of locking the said gears with the cam wheels during the forward movement of the mower, I provide ratchet keys 12 and 12' which, as shown, are loosely pivoted at one end upon the inner sides of said wheels, the opposite ends of which engage the cogs in the gears 5 and 5'. When the mower is driven forward, the said keys bear against the lugs 13 and 13', in which position they are normally held by the springs 14 and 14', and thus revolve the cam wheels with the driven gear wheels, and when the mower is reversed, the said ratchet keys ride out of engagement with the cogs and uncouple the driving mechanism whereby the cam wheels and cutting bar, hereinafter described, remain idle.

Adjacent to the forward end of the side frames 1 and 1', I provide a roller 15 loosely mounted on the transverse shaft 16 adapted to support that end of the mower. Adjustably secured at the forward end of said frames, I provide forwardly extending arms 17 and 17' upon the outer ends of which is carried the rigid knife shoe 18 of ordinary construction, having a transverse channel 18', upon which is carried the reciprocating cutting bar 19 having the toothed blades 20. The cutting bar 19 is reciprocated transversely by the rocking bars 11 and 11' which, as shown, are pivoted intermediate of their ends upon the transverse bar 21 and have their inner ends in engagement with the cam slots 9 and 9' while their opposite or forward ends are bifurcated at 22 and embrace the lugs 23 and 23' upon the cutting bar 19.

As shown in the drawings, the cutting bar 19 and knife shoe 18 may be adjusted vertically to regulate their height from the ground. The arms 17 and 17' upon which they are carried are pivoted intermediate of their ends upon the transverse shaft 16, while their rear ends are secured upon the side frames 1 and 1' by the bolts 24 and 24' passing through slots 25 and 25' in the said side frames, and it will be apparent that the outer ends of said arms and the knife shoe and cutting bar carried thereon may be raised and lowered by the relative adjustment of the inner ends of the arms upon the frames.

The top of the mower may be incased in the cover 26 to protect it from the clogging of the operating parts by the grass that has been cut.

Having thus described my invention, what I claim as new and desire to be secured by Letters Patent, is—

The combination with side frames, of a driving wheel mounted thereon having gear wheels rigidly secured thereon, cam wheels loosely mounted on said frames having inwardly extending hubs, driven gear wheels loosely journaled on said hubs, a spring pressed ratchet key pivoted on the side of said cam wheels normally held in engagement with the driven gear wheels, forwardly extending pivoted arms carried on the forward ends of said side frames carrying a knife shoe and cutting bar upon their outer ends, the opposite or inner ends thereof being adjustably secured upon the side frames whereby the knife shoe and cutting bar may be adjusted vertically, and pivoted rocking bars connecting said cam wheels and cutting bar adapted to reciprocate the latter, substantially as described.

In testimony whereof, I have hereunto signed my name to this specification, in the presence of two subscribing witnesses.

LEWIS L. LOVETT.

In the presence of—
GEORGE G. SCHIEFFELIN,
HENRY P. GIFFORD.